United States Patent Office 2,769,016
Patented Oct. 30, 1956

2,769,016

CATALYTIC PROCESS OF OXIDIZING ETHYLENE TO ETHYLENE OXIDE WITH OZONE OR HYDROGEN PEROXIDE AS CARBON DIOXIDE REPRESSANTS

Myrl Lichtenwalter, Edward S. Peterson, and Donald K. Sacken, Austin, Tex., assignors to Jefferson Chemical Company, Inc., New York, N. Y., a corporation of Delaware No Drawing. Application May 14, 1953,
Serial No. 355,177

9 Claims. (Cl. 260—348.5)

This invention relates to the oxidation of ethylene to ethelene oxide, and more particularly to catalytic processes for oxidizing ethylene to ethylene oxide under conditions which repress or minimize undesired side reactions.

In the catalytic oxidation of ethylene to ethylene oxide, side reactions invariably take place, such as the complete oxidation of the ethylene to carbon dioxide and water, and oxidation of the desired ethylene oxide product and its conversion to acetaldehyde which may then itself be further oxidized. The complete oxidation of ethylene to carbon dioxide and water liberates much more heat than the desired partial oxidation to ethylene oxide, with consequent local overheating of the catalyst and formation of hot spots in the reactor. These hot spots favor complete oxidation of the ethylene to carbon dioxide so that a runaway reaction ensues and the yield of desired ethylene oxide is sharply reduced.

It is among the objects of this invention to provide a catalytic process for the oxidation of ethylene to ethylene oxide in which undesired side reactions such as those resulting in the formation of carbon dioxide and water are minimized or repressed with consequent improvement in the yield of ethylene oxide.

Other objects and advantages of this invention will be apparent from the following detailed description thereof.

In accordance with this invention a small amount of ozone or hydrogen peroxide is passed over the silver catalyst along with the reactants. The amount thus passed over the catalyst simultaneously with the reactions should be within the range of from about 0.0001% to 0.1%, preferably from 0.0003% to 0.05%, based on the volume of the reactants. Surprisingly, it has been found that by so doing undesirable side reactions are suppressed and the yield of ethylene oxide is materially increased.

The amount of hydrogen peroxide or ozone within the above noted range introduced into the reaction zone will depend upon the conditions of operation and the type or form of catalyst. Thus a long fixed bed of catalyst may require more than a short fixed bed of catalyst. A fluid bed of catalyst may require less than a fixed bed of catalyst of the same size as the fluid bed.

For any given converter operation, the optimum amount of ozone or hydrogen peroxide employed is preferably determined by observing the improvement in yield of ethylene oxide upon use of varying amounts of ozone or hydrogen peroxide as the case may be. The effect obtained by the use of a definite amount of ozone or hydrogen peroxide can readily be determined by analyzing a sample of the reaction gases and calculating from the ethylene, carbon dioxide, and ethylene oxide contents the conversion of ethylene to ethylene oxide and the yield of ethylene oxide based on the total ethylene reacted. From such data for different amounts of ozone or hydrogen peroxide the optimum amount can readily be determined. The use of an excess of ozone or hydrogen peroxide will cause a decline in yield and should, of course, be avoided. In general, the addition of ozone to the reaction zone in amount within the range of from about 0.0003% to about 0.05% and the addition of hydrogen peroxide in amount within the range of from about 0.0001% to about 0.05% by volume based on the total volume of ethylene and air or other oxygen-containing gas passed over the catalyst will result in a substantial improvement in the yield of ethylene oxide.

In the case of the ozone, it is important to avoid premixing of the ethylene with the ozone because ozone combines with ethylene to form a dangerous ozonide. Accordingly, the ozone is introduced into the reaction zone, i. e., where the catalyst is present, by continuously passing all or a portion of the air or other oxygen-containing gas through a suitable ozone generator and thereafter continuously passing the oxygen-and-ozone-containing gas into the reaction zone. The air or other oxygen-containing gas (at least a part of which has been ozonized) and the ethylene are introduced separately into the reaction zone and allowed to mix only in the presence of the catalyst. In this way, the formation of dangerous ozonides is minimized, if not completely prevented. It has been found that by avoiding mixing of the oxygen-and-ozone-containing stream with the ethylene stream, except in the presence of the silver catalyst, the oxidation reaction proceeds smoothly and safely.

The ozone content of the oxygen-containing gas, which is preferably air, can be determined by any well known means. For example, the gas stream containing oxygen and ozone may be passed through a potassium iodide solution and the liberated iodine titrated with a standard sodium thiosulfate solution.

When using hydrogen peroxide as the repressant, the hydrogen peroxide may be added to the reactions or directly to the reaction zone. It is possible to introduce the hydrogen peroxide continuously into the reaction zone by passing a small amount of a gas, such as nitrogen, oxygen or air through an aqueous solution of hydrogen peroxide of from 3% to 90% concentration, preferably about 30% concentration and continuously adding this gas-hydrogen peroxide stream to the oxygen-containing gas-ethylene feed stream prior to the entrance of the latter into the reaction zone. A preferred way of adding hydrogen peroxide is by pumping a metered amount of 30% aqueous hydrogen peroxide directly into the stream of oxygen-containing gas prior to the entrance of the latter into the reaction zone.

This invention is applicable to both fixed bed and fluid bed catalytic oxidation of ethylene to ethylene oxide involving the use of a silver catalyst including a "boiling bed," fluidized bed and moving bed of catalyst.

As the catalyst employed in the practice of this invention, any known catalyst capable of catalyzing the oxidation of ethylene to ethylene oxide may be used. Where a catalyst is to be used in a fluid bed it should be reduced to a state of subdivision such that the catalyst particles may be maintained in the fluidized state under the temperature and pressure conditions maintained in the catalyst converter. For example, the catalyst particles may have a size of from about 1 to about 150 microns, preferably from 40 to 80 microns.

The silver catalyst used may be substantially pure silver or silver oxide in finely divided form, catalyst made by mixing silver or silver oxide with aluminum oxide, Carborundum, or other similar suitable inert material or supported silver catalysts. When silver oxide is used it is reduced in use either by a separate reduction treatment or by the flow of the ethylene and air over the catalyst during the initial stages of operation. In the case of substantially pure silver or silver oxide finely divided particles of silver or silver oxide may be used.

In the case of mixed catalysts, aluminum oxide or Carborundum may be mixed with silver in the form of silver oxide to produce a catalyst containing from 10% to 50%, preferably 15% to 35% by weight of silver.

In the case of supported silver catalysts the silver may be deposited chemically or mechanically from suspensions of finely divided silver or silver oxide on a powdered support, such as aluminum oxide, other fused alumina refractory materials, Carborundum, artificial silica or stone. Catalysts, as disclosed, for example, in copending application Serial No. 249,221, filed October 1, 1951, may be used. In these catalysts the carrier or support which may be silicon carbide or fused or crystalline alumina refractory materials including but without limitation Alundum, Alusite, mullite and tabular corundum crushed and screened to a convenient size prior to deposition of the silver thereon is pretreated with a dilute solution of an inorganic chlorine containing compound, e. g., aqueous solutions of sodium chloride, barium chloride, lithium chloride, hydrogen chloride, or potassium chlorate. The catalysts of copending application Serial No. 249,223, filed October 1, 1951 (now Patent No. 2,671,-766), may also be employed in the practice of this invention. These catalysts are made by coprecipitating silver oxide and a silver salt that is appreciably more soluble in water than silver oxide, thereafter removing the more water-soluble silver salt resulting in a silver oxide having a highly active skeleton form which preferably is deposited on a suitable support, such as those hereinabove enumerated. Examples of such catalysts are coprecipitated (a) silver oxide and silver sulfate, (b) silver oxide and silver acetate, (c) silver oxide and silver permanganate (d) silver oxide and silver nitrite, (e) silver oxide and silver tartrate, (f) silver oxide and silver citrate, and (g) silver oxide and silver propionate.

Promoted catalysts may be employed. Examples of such promoted catalysts are those disclosed in copending application Serial No. 249,222 filed October 1, 1951 (now Patent 2,671,764), in which an alkali metal sulfate, such as sodium or potassium sulfate, is incorporated in the catalyst as a promoter. Catalysts containing other promoters may be used; examples of such other promoters are gold, copper, iron, titanium dioxide and the oxides, hydroxides or peroxides of the alkali or alkaline earth metals, such as sodium, potassium, calcium, barium, lithium or strontium.

In fluidized catalyst processes using supported silver catalysts in which the silver has been deposited chemically on the support, it is preferred to dilute the silvered support with unsilvered support, using generally between about one and about three volumes of unsilvered support to each volume of silvered support. Such dilution of the silvered particles with unsilvered support greatly improves the fluidization characteristics of the catalyst.

The reactants may consist of a mixture of ethylene and oxygen or ethylene and a gas, such as air, containing oxygen. The stream of reactants may contain, in addition to the ozone or hydrogen peroxide repressant, from 0% to 3% by volume of moisture and from 0% to 6% by volume of carbon dioxide. When employing a fluid bed of catalyst, it has been found that optimum results are obtained by having present in the stream of reactants small amounts of repressant, water and carbon dioxide. Desirably, the gaseous reaction product, after removal of the ethylene oxide, is recirculated through the bed of catalyst so that as the reaction proceeds in addition to ethylene and oxygen the gas stream passed through the catalyst contains carbon dioxide, nitrogen, water, small amounts of ethylene oxide and the ozone or hydrogen peroxide. Using air as the source of oxygen the reactant gases passed through the catalyst may contain from 4% to 10% ethylene, approximately 8% to 20% oxygen, small amounts of repressant, water and carbon dioxide, the rest being chiefly nitrogen; the air and ethylene may be mixed in the ratio of from about 10 to about 25 volumes of air per volume of ethylene.

The reaction is carried out at a temperature of from 200° to 400° C., preferably from 220° to 300° C. A reaction temperature within this range is maintained by removing the heat of reaction by a suitable cooling medium, such as Dowtherm in heat exchange relation with the catalyst, the flow of which medium desirably is controlled to maintain the temperature of the catalyst substantially constant within this range.

The reaction may be carried out under atmospheric pressure conditions or superatmospheric pressures up to 150 pounds per square inch gauge, or even higher pressures. For economic reasons from the standpoint of design of the equipment, it is preferred to operate at a pressure not exceeding about 150 pounds per square inch gauge.

The reactants are passed through the catalyst at a rate so that the contact time is from 2 to 30 seconds, preferably from 4 to 12 seconds. By "contact time" is meant the time in seconds required for a unit volume of reactants to pass through the catalyst; the contact time may be determined by dividing the volume of the reaction space by the volume of reactants fed per second measured at the mean catalyst temperature and the pressure conditions under which the catalyst is maintained.

The folowing examples are illustrative of the operation of the process of this invention in oxidizing ethylene to ethylene oxide. It will be understood this invention is not limited to these examples:

EXAMPLE I.—OZONE-FIXED BED OF CATALYST

This example was carried out in a catalyst converter employing a fixed bed of catalyst consisting of 4–8 mesh Alundum coated with silver oxide containing a minor proportion of sodium sulfate, i. e., the catalyst disclosed in copending application Serial No. 249,222. The catalyst was activated in place using 20:1 air and ethylene as a reducing gas at a temperature of 200° to 250° C.

A petroleum-derived ethylene containing 95% ethylene and air in the proportion of 20 volumes of air per volume of ethylene was passed through this catalyst at a temperature of 260° C., under atmospheric pressure at a space velocity of 411 volumes per volume of catalyst per hour. The contact time was about 4.5 seconds.

For a period of 136 hours the conversion varied in the range of 18% to 22% while the yield of ethylene oxide was in the range of 40% to 42%.

Thereafter a portion of the air was passed through an ozone generator and the ozonized air introduced into the converter where it mixed with the ethylene in the presence of the catalyst. Ozone was thus introduced into the reaction zone in amount of from about 0.005% to 0.05% by volume based on the volume of the reactants.

For a test period of about 100 hours, the conversion was observed to be in the range of 40% to 42% and the yield of ethylene oxide in the range of 58% to 63%.

EXAMPLE II.—OZONE-FLUIDIZED BED OF CATALYST

This example was carried out employing a fluid bed type of catalyst consisting of uncoated Alundum support and Alundum support on which a mirror-type of silver coating had been deposited. The catalyst particles had in average particle size of from 50 to 70 microns. The silver-coated particles were prepared so as to carry 11% by weight of silver, and were mixed with two and a third times their weight of uncoated support so that the final catalyst mixture contained about 3.3% by weight of silver.

A petroleum-derived ethylene containing 95% ethylene and air in the proportion of 20 volumes of air per volume of ethylene were passed through this catalyst at the rate of 3.4 volumes per pound of catalyst per hour under atmospheric pressure and at a temperature of 270° C. The contact time was about 9 seconds. The air stream was passed through an ozone generator and the resultant ozonized air stream introduced into the catalyst converter where it mixed with the ethylene in the presence of the catalyst. There was thus introduced into the reaction zone from 0.0003% to 0.05% by volume of ozone based on the volume of the reactants.

Over a 24 hour test period a conversion of 31% and a yield of 58% of ethylene oxide was obtained.

In a control experiment extending over 120 hours which differed from the test hereinabove described in the omission of the ozone, a yield of only 35% to 39% was obtained, indicating an excessive oxidation of ethylene to carbon dioxide and water.

EXAMPLE III.—HYDROGEN PEROXIDE - FIXED BED OF CATALYST

The catalyst used in this example was prepared by coating 4 to 8 mesh Alundum with a mix composed of silver oxide and sodium sulfate and was similar to that of Example I.

A petroleum-derived ethylene containing 95% ethylene and air in the ratio of 20 volumes of air per volume of ethylene was passed through a fixed bed of this catalyst at a space velocity of about 400 volumes per volume of catalyst per hour. The contact time was about 4.2 to 4.5 seconds. The catalyst was maintained at a temperature of from 260° to 290° C. under atmospheric pressure conditions.

Operating without any hydrogen peroxide introduced into the reaction zone during 136 hours of use, yields of from 40% to 42% and conversions of 18% to 22% were obtained. Introducing from 0.0001% to 0.0005% of hydrogen peroxide into the reaction zone by bubbling a stream of nitrogen through aqueous hydrogen peroxide solution of about 30% concentration and adding this side stream to the stream of air and ethylene entering the catalyst converter, gave yields of 57% to 67% and conversions of 40% to 50% at 260° C.

Data on another run involving use of this catalyst in a fixed bed and continuous introduction of hydrogen peroxide in the amounts below indicated is given in Table 1 below. This run lasted for 664 hours. At the end of this time when the run was terminated the catalyst performance was still excellent.

Table 1

| $H_2O_2$, Vol. Percent in Feed Stream | Conversion | Percent Yield | Percent Activity | Hours | Catalyst, Temp. in °C. |
|---|---|---|---|---|---|
| 0 | 31 | 50 | 63 | 0–18 | 260 |
| 0.00014 | 28–43 | 56–67 | 50–64 | 161–232 | 260 |
| 0.00018 | 49–53 | 63–69 | 84–71 | 232–305 | 270 |
| 0.00018 | 56 | 62 | 90 | 305–328 | 280 |
| 0.00022 | 56 | 67 | 83–84 | 328–376 | 280 |
| 0.00025 | 55 | 59 | 93 | 376–400 | 290 |
| 0.00032 | 53–55 | 60–54 | 94–96 | 400–470 | 290 |
| 0.00032 | 53 | 61 | 87 | 470–495 | 280 |
| 0.00032 | 53–51 | 63 | 80–84 | 495–545 | 270 |
| 0.00040 | 49–51 | 61–62 | 81–83 | 545–664 | 270 |

In this specification by "activity" is meant the percentage of the total ethylene which is oxidized. By the "yield" is meant the percentage of oxidized ethylene which is converted to ethylene oxide. By "conversion" is meant the percentage of the feed ethylene which is converted to ethylene oxide.

It will be noted that the passage of small amounts of ozone or hydrogen peroxide along with the ethylene and oxygen-containing gas over the silver catalyst results in a marked and surprising improvement in the yield of ethylene oxide.

Since certain changes may be made in carrying out the above process without departing from the scope of the invention, it is intended that all matter contained in the above description shall be interpreted as illustrative and not in a limiting sense.

What is claimed is:

1. In the production of ethylene oxide by the catalytic oxidation of ethylene with an oxygen-containing gas in the presence of a silver catalyst at a temperature of from 200° to 400° C., the improvement which comprises passing up to about 0.1% by volume of a material from the group consisting of ozone and hydrogen peroxide over the catalyst along with the reactants in amount to effect an improvement in the yield of ethylene oxide.

2. In the production of ethylene oxide by the catalytic oxidation of ethylene with an oxygen-containing gas in the presence of a silver catalyst at a temperature of from 200° to 400° C., the improvement which comprises passing up to about 0.1% by volume of ozone over the catalyst along with the reactants in amount to effect an improvement in the yield of ethylene oxide.

3. In the production of ethylene oxide by the catalytic oxidation of ethylene with an oxygen-containing gas in the presence of a silver catalyst at a temperature of from 200° to 400° C., the improvement which comprises passing up to about 0.1% by volume of hydrogen peroxide over the catalyst along with the reactants in amount to effect an improvement in the yield of ethylene oxide.

4. In the production of ethylene oxide by the catalytic oxidation of ethylene with an oxygen-containing gas in the presence of a silver catalyst at a temperature of from 200° to 400° C., the improvement which comprises passing from 0.0003% to 0.05% by volume of ozone along with the reactants over the catalyst.

5. The process defined in claim 4, in which the oxygen-containing gas is ozonized and the resultant oxygen-and-ozone-containing gas mixes with the ethylene only in the presence of the catalyst.

6. In the production of ethylene oxide by the catalytic oxidation of ethylene with an oxygen-containing gas in the presence of a silver catalyst at a temperature of from 200° to 400° C., the improvement which comprises passing from 0.0001% to 0.05% by volume of hydrogen peroxide along with the reactants over the catalyst.

7. In the oxidation of ethylene to ethylene oxide by passing a stream of air and ethylene over a silver catalyst at a temperature of from 200° to 400° C., the improvement which comprises continuously passing at least a portion of said air stream through an ozonizer to ozonize a portion of the air, continuously flowing the air stream containing ozone over the silver catalyst while simultaneously passing a stream of ethylene over said catalyst, said ozone amounting to about 0.0003% to 0.05% by volume based on the volume of the reactants, and continuously withdrawing the reaction products.

8. In the oxidation of ethylene to ethylene oxide by passing a stream of air and ethylene over a silver catalyst at a temperature of from 200° to 400° C., the improvement which comprises continuously passing a stream of an inert gas through a hydrogen peroxide solution, continuously mixing the gas containing hydrogen peroxide with a stream of air and ethylene said hydrogen peroxide amounting to about 0.0001% to 0.05% by volume based on the volume of the reactant and passing the resultant mixture over the catalyst and continuously withdrawing the reaction products.

9. The process as defined in claim 8, in which the gas is nitrogen.

References Cited in the file of this patent

UNITED STATES PATENTS

| | | |
|---|---|---|
| 2,142,948 | Law | Jan. 3, 1939 |
| 2,265,948 | Loder | Dec. 9, 1941 |
| 2,279,470 | Law | Apr. 14, 1942 |
| 2,593,098 | Burt | Apr. 15, 1952 |
| 2,593,156 | Lamb | Apr. 15, 1952 |
| 2,622,088 | Thomas | Dec. 16, 1952 |

OTHER REFERENCES

Murray: Australian J. Sci. Research 3A:433–449 (1950).